United States Patent [19]

Lyman

[11] 4,154,489
[45] May 15, 1979

[54] RATE RESPONSIVE CONTROL FOR MAGNETIC SUSPENSION SYSTEM

[75] Inventor: Joseph Lyman, Kennebunk, Me.

[73] Assignee: Cambridge Thermionic Corporation, Cambridge, Mass.

[21] Appl. No.: 806,802

[22] Filed: Jun. 15, 1977

[51] Int. Cl.$^2$ ............................................. F16C 39/00
[52] U.S. Cl. ....................................................... 308/10
[58] Field of Search ........................... 308/10; 74/5.6 R

[56] References Cited

U.S. PATENT DOCUMENTS

| | | | |
|---|---|---|---|
| 3,761,148 | 9/1973 | Grosbard | 308/10 |
| 3,976,339 | 8/1976 | Sabnis | 308/10 |
| 4,057,369 | 11/1977 | Isenberg | 308/10 |

FOREIGN PATENT DOCUMENTS

| | | | |
|---|---|---|---|
| 2136371 | 2/1973 | Fed. Rep. of Germany | 308/10 |
| 1273897 | 9/1961 | France | 308/10 |

Primary Examiner—R. Skudy
Attorney, Agent, or Firm—Thomas M. Ferrill, Jr.

[57] ABSTRACT

Improved apparatus is disclosed for use in a magnetic suspension system for developing signals representative of the rate of displacement of a magnetically suspended body along one or more axes thereof for use in applying forces to the body to restore it to a desired stable position. Specifically there are provided a plurality of thin, closely-spaced discs of permanent magnet material affixed to the body and a plurality of conductive windings respectively cooperating with the magnetic fields produced by said magnets, pairs of said windings being interconnected so that currents induced therein by the fields of the magnets tend to reinforce each other and so that currents induced therein by stray fields tend to cancel. The resultant currents induced in the windings are representative of rate of displacement of the suspended body and may be combined with separately derived signals representative of displacement of the body for use in applying forces to the body to restore it to its desired stable position. By suitably arranging the permanent magnets and their cooperating windings, signals may be developed representative of rates of displacement along several different axes so as to permit complete control over all possible displacements of the suspended body. In addition, in certain embodiments of the invention, there may be provided means for deriving from the rate-representative signals, signals representative of acceleration of the suspended body which also may be used to control the application to the body of forces to restore it to its desired stable position.

8 Claims, 3 Drawing Figures

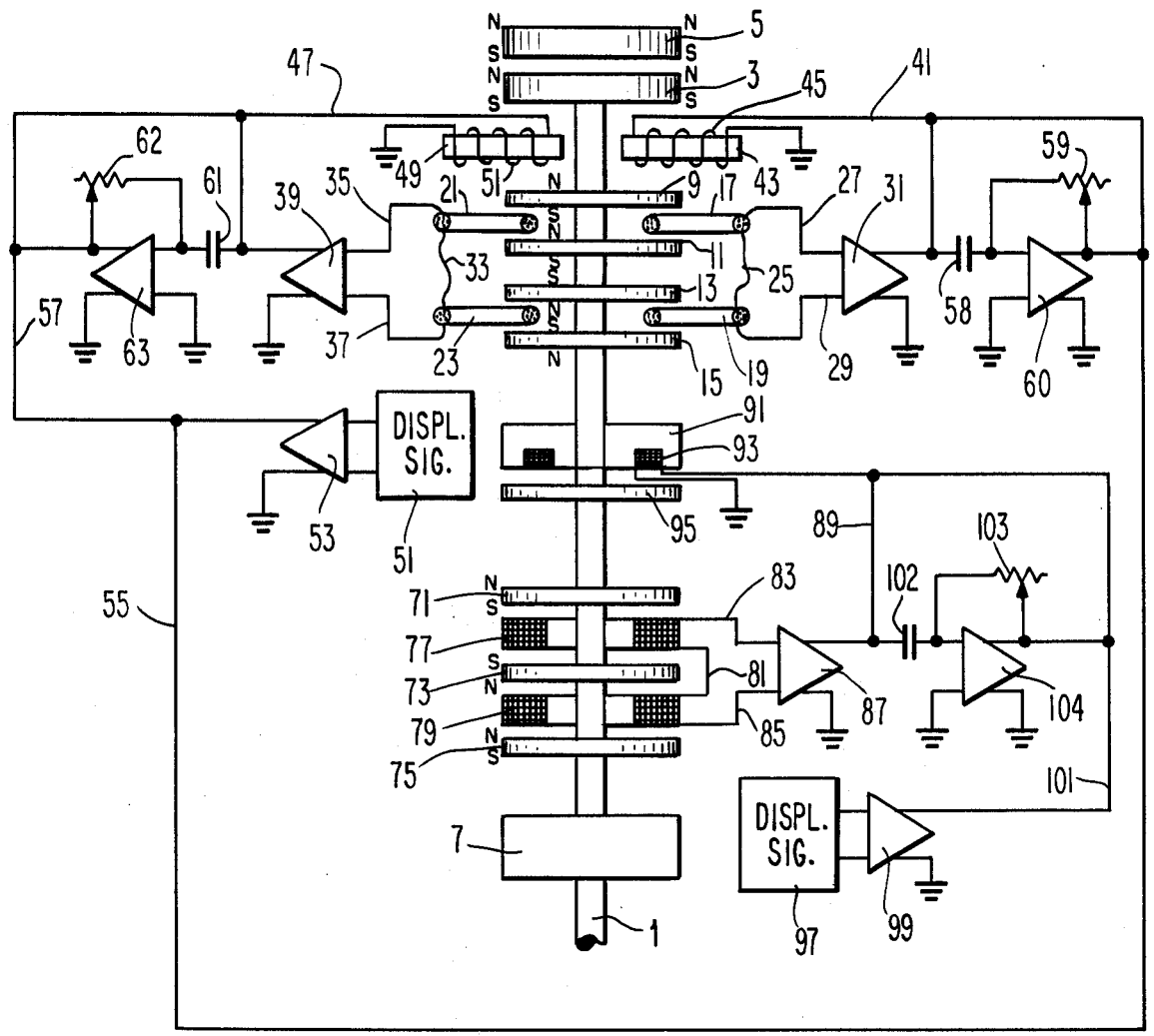
*Fig. 1*
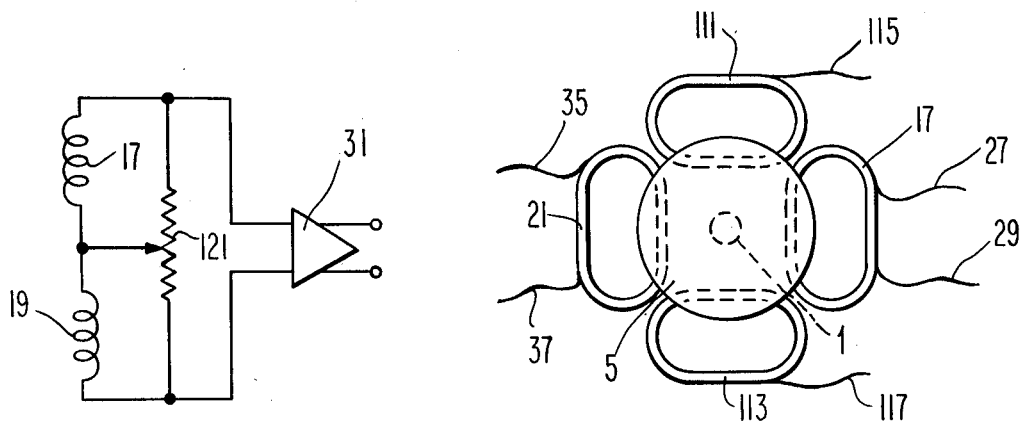
*Fig. 3*  *Fig. 2*

RATE RESPONSIVE CONTROL FOR MAGNETIC SUSPENSION SYSTEM

This invention relates to magnetic suspension systems of the sort in which magnetic forces are applied to a body to maintain it in suspension so that it may be caused to rotate about one of its axes with a minimum of friction tending to inhibit such rotation, and in which means are provided, responsive to the displacement and rate of displacement of said body in one or more directions from a desired stable position, for tending to restore the body to said position. Such systems are disclosed and claimed, for example, in my prior U.S. Pat. No. 3,428,371 granted Feb. 18, 1969, No. 3,565,495 granted Feb. 23, 1971, No. 3,860,300 granted Jan. 14, 1975 and in U.S. Patents No. 3,791,704 granted Feb. 12, 1974 to Lloyd J. Perper.

In such systems, signals representative of the rate of displacement of the suspended body have in the past been produced in various ways. One such way involved the direct measurement of the rate of displacement using a Faraday generator comprising a magnet affixed to the body and a cooperating coil in which signals representative of the rate of displacement of the body were induced. Such generators employed multi-turn coils, e.g., of 20,000-50,000 turns, which tended to produce unwanted signals in response to stray magnetic fields such as those from the force-applying coils of the magnetic bearing with which the generator was associated. Attempts to avoid this difficulty involved the use of cumbersome shielding or undesirable polarization of the force coil. Another way of producing the rate-representative signal involved deriving it from a displacement-representative signal by differentiation using a lead/lag network. While this method avoided the problem of extraneous signals, such systems tended to be noisy and, when very small magnetic gaps were employed, ineffective because of the very short time response required. Furthermore, while these methods gave fairly satisfactory results in magnetic bearing systems where the stiffness requirements were relatively low—i.e., of the order of 300 to 400 pounds per inch—it has been found that they will not perform satisfactorily where the stiffness requirements are much higher—i.e., of the order of 50,000 pounds per inch or greater.

Accordingly it is an object of the present invention to provide improved rate-responsive control systems for use in magnetic suspension systems which are not subject to the foregoing difficulties and which are capable of operating effectively in magnetic bearing systems where the stiffness requirements are exceedingly high.

In accordance with the invention, the foregoing object is achieved in a system employing means affixed to the suspended body for producing a plurality of separate magnetic fields and a plurality of conductive windings cooperating with said magnetic field producing means for developing signals directly representative of rate of displacement of the body, the magnetic field producing means consisting of permanent magnet material of low permeability, such as samarium cobalt, arranged in very thin, closely spaced sections, and the conductive windings respectively being positioned at least partially within the magnetic fields produced between adjacent pairs of magnets. The individual windings are interconnected in such a manner that currents induced therein by the permanent magnet fields in response to movement of the body tend to reinforce each other and so that currents induced therein by stray magnetic fields tend to cancel. The currents induced in the windings by the permanent magnets are then used to control the application of forces to the suspended body tending to restore it to its desired stable position. In a magnetic suspension system, a plurality of these arrangements may be provided for sensing the rate of displacement of the suspended body along several of its different axes, the signals developed in each of the arrangements being used to control the application of forces along each of these axes to restore the body to its desired stable position.

Further in accordance with the invention, in some instances it may be desirable to provide additional means for deriving from the aforementioned rate-representative signals, signals representative of the acceleration of the suspended body and for utilizing such derived signals also to control the application of forces to the body to restore it to its desired stable position. Such means may comprise conventional differentiating circuits supplied with the rate-representative signals.

The invention will be fully understood from consideration of the following detailed description with reference to the accompanying drawings in which:

FIG. 1 is a schematic view in elevation of the upper portion of a symmetrical magnetic suspension system in accordance with the invention.

FIG. 2 is a partial schematic plan view of the same system showing certain elements of the system which are omitted in FIG. 1 for the purpose of clarity, and FIG. 3 is a schematic diagram of a balancing circuit for use with the apparatus of FIG. 1.

Referring now to FIG. 1, there is shown schematically the upper portion of a magnetic suspension system in accordance with the invention, the lower portion of the system being omitted since it may be identical to and a mirror image of the upper portion of the system.

In FIG. 1 a body to be magnetically suspended by the system is shown comprising a rod 1 of soft iron or other suitable magnetically permeable material having a disc 3 of permanent magnet material affixed to its upper end in juxtaposition to a similar disc 5 of permanent magnet material, the discs 3 and 5 being magnetized in the direction of their vertical axes and respectively polarized as shown to exert an upward force on the rod 1 to maintain it in suspension. A similar disc of permanent magnet material (not shown), corresponding to the disc 3, may be affixed to the lower extremity of rod 1 and adapted to cooperate with a disc of magnetic material (not shown), similar to the disc 5, positioned in juxtaposition thereto, said discs being magnetized along their vertical axes and so polarized as to exert a downward force on the rod 1 to partially conteract the upward force exerted by the magnets 3 and 5 at the upper end thereof. Conventional means, represented by the block 7, may be provided for producing a rotating magnetic field to coact with rod 1 to cause it to rotate at high speed about its vertical axis.

Affixed to rod 1 below disc 3 and spaced vertically along rod 1 are a plurality of discs 9, 11, 13 and 15 of permanent magnet material which, in accordance with the invention, consist of a permanent magnet material of low permeability, such as samarium cobalt. Also, in accordance with the invention, they should be relatively thin and spaced as closely together as possible along the vertical axis of rod 1. The upper pair of these discs 9 and 11 are similarly polarized as shown in the vertical direction and the lower pair of discs 13 and 15 likewise are similarly polarized as shown, but in the direction opposite to that of the discs 9 and 11.

A pair of electrically conductive windings 17 and 19, each comprising conductors disposed in planes substantially perpendicular to the axis of rod 1, are positioned on the right-hand side of rod 1, each with a portion thereof interposed between adjacent ones of the discs 9, 11, 13 and 15 of like polarization. Thus a portion of winding 17 is interposed between the upper pair of discs 9 and 11, and a portion of winding 19 is interposed between the lower pair of discs 13 and 15. A similar pair of windings 21 and 23 are positioned on the left-hand side of rod 1 with a portion of winding 21 interposed between discs 9 and 11 and a portion of winding 23 interposed between discs 13 and 15. Similarly, a plurality of discs of permanent magnet material (not shown) similar to discs 9-15 may be affixed to rod 1 near the lower extremity thereof and spaced along its vertical axis. Also windings (not shown) corresponding to windings 17-23 may be positioned with portions thereof interposed between said discs on the right-hand and left-hand sides of rod 1.

Because of the positioning of windings 17-21 in relation to permanent magnet discs 9-15 as described above, any motion of the upper end of rod 1 to the right or left in the direction transverse to its axis will cause currents to be induced in windings 17-21 proportional to the rate of such displacement. In accordance with the invention windings 17 and 19 are interconnected through a lead 25 in such a manner that the currents induced therein will reinforce each other at the output leads 27 and 29 thereof which are connected to the input of an amplifier 31, and so that currents induced in windings 17 and 19 by stray magnetic fields tend to cancel.

Note that since the magnetic fields locally produced by the oppositely polarized pairs of disc magnets are opposite to each other, and since the currents they induce in the two windings 17 and 19 as connected together are mutually reinforcing (i.e., adding), the influence of a stray field is to produce mutually opposing currents (i.e., currents tending to cancel each other) since the stray field would not be acting in opposite directions relative to two windings such as windings 17 and 19 in close proximity to each other. Similarly windings 21 and 23 are interconnected by a lead 33 so that the currents induced therein will reinforce each other at the output leads 35 and 37 thereof which are connected to the input of an amplifier 39, and so that currents induced therein by stray fields oppose each other and therefore tend to cancel. The signal appearing at the output of amplifier 31 is combined with a signal representative of displacement of the upper end of rod 1 to the right or left in the direction transverse to its vertical axis, which signal may be derived in any suitable manner, as disclosed for example in my U.S. Pat. No. 3,860,300 granted Jan. 14, 1975. Since means for deriving such a signal are well known in the art, it is here represented as a block 51 from which a signal representative of displacement is supplied to an amplifier 53, the output of which is applied through lead 55 to the output of amplifier 31 for combination with the signal representative of rate of displacement. The combined signals are then supplied through lead 41 to a magnetic force applier comprising a permeable core 43 and a winding 45 positioned adjacent the upper end of rod 1 for applying thereto a force in the direction transverse to the vertical axis thereof for tending to restore the upper end of rod 1 to its desired stable position. Similarly the output from the left-hand amplifier 39 is combined with a displacement-representative signal from the output of amplifier 53 through lead 57, and the resultant signal is supplied through lead 47 to a force applier 49 comprising a permeable core 49 and a winding 51 for applying force to the upper end of rod 1 also in the direction transverse to its vertical axis for cooperating with the force applied by the right hand force applier 43, 45 for tending to restore the upper end of rod 1 to its normal stable position.

Further in accordance with the invention, in some instances it may be desirable to derive, from the rate-representative signals appearing at the outputs of amplifier 31 and 39 respectively, signals representative of acceleration—i.e., the derivative of the rate of displacement or the second derivative of displacement—which signals may be added to the displacement and rate-representative signals supplied to force appliers 43,45 and 49,51 and which will serve further to improve the stability of the suspension system and provide increased protection against external shock. Means for performing this added function are shown in FIG. 1 and comprise conventional differentiating circuits comprising capacitor 58, resistor 59 and amplifier 60 and capacitor 61, resistor 62 and amplifier 63 respectively connected between the output of amplifier 31 and lead 55 and between the output of amplifier 39 and lead 57.

Apparatus similar to that just described also may be provided responsive to currents induced in the windings associated with permanent magnet discs at the lower end of rod 1 for applying forces to the lower end of rod 1 to tend to restore it to its normal stable position when displaced therefrom.

While the apparatus described above is capable only of developing signals representative of displacement and rate of displacement of the ends of rod 1 in a single direction transverse to its vertical axis—i.e., right and left from its normal stable position—and for utilizing said signals to control the application of forces to rod 1 in that direction tending to restore it to its normal stable position, substantially identical means may also be provided for developing signals representative of displacement and rate of displacement of rod 1 in the direction at right angles to the first (right-left) direction and for controlling the application of force to rod 1 in that direction to counteract displacements of rod 1 in that direction. By the provision of such additional apparatus in addition to that described above, complete control may be exercised over displacements of the upper end of rod 1 in any direction transverse to its vertical axis. In providing such additional apparatus, permanent magnet discs 9-15 and their counterparts affixed to the opposite end of rod 1 need not be duplicated. Only additional windings disposed along a transverse axis at right angles to that of windings 17-23, additional amplifiers corresponding to amplifiers 31 and 39, additional differentiating circuits corresponding to differentiating circuits 58, 59, 60 and 61, 62, 63, and additional force appliers corresponding to force appliers 43, 45 and 49, 51, need be provided. In the interest of simplification and clarity, such additional apparatus has not been shown in FIG. 1, but the arrangement of such additional apparatus will be apparent from observation of FIG. 2 which is a partial plan view of the apparatus of FIG. 1 which additionally shows the positioning of windings for sensing the rate of displacement of rod 1 in the direction at right angles to that sensed by windings 17-23 in FIG. 1. In FIG. 2 windings 17 and 21 of FIG. 1 are represented by the same reference numerals, and additional windings 111 and 113 are shown disposed on opposite sides of rod 1 along an axis at right angles to that of windings 17 and 21.

In addition to the apparatus described in the preceding two paragraphs for controlling displacement of the upper end of rod 1 in the direction at right angles to the right-left direction, similar apparatus may be provided at the lower end of rod 1 for developing signals representative of the rate of displacement thereof in the direction at right angles to the right-left direction and for controlling the application of force to the lower end of rod 1 in that direction to counteract such displacement.

Referring again to FIG. 1, affixed to rod 1 below discs 9-15 are a further plurality of discs 71, 73 and 75, also consisting of permanent magnet material of low permeability, such as samarium cobalt. Discs 71-75 likewise are spaced apart along the vertical axis of rod 1 and each of them is polarized in the vertical direction, the upper disc 71 and the lower disc 75 being similarly polarized, and the intermediate disc 73 being polarized in the direction opposite to that of discs 71 and 75. Respectively interposed between discs 71 and 73 and between discs 73 and 75 are toroidal windings 77 and 79, each encircling rod 1. Any motion of rod 1 either up or down in the direction of its vertical axis will produce corresponding motion of the magnetic fields associated with discs 71-75, which in turn will cause currents to be induced in windings 77 and 79 proportional to the rate of displacement of rod 1 up or down along its vertical axis. Windings 77 and 79 are interconnected through lead 81 in such a manner that the currents induced therein will reinforce each other at the output leads 83 and 85 which are connected to the input of an amplifier 87, and so that currents induced in windings 77 and 79 by stray magnetic fields tend to cancel. The signal appearing at the output of amplifier 87 is combined with a signal representative of displacement of rod 1 along its vertical axis, which signal also may be derived in any suitable manner, as disclosed for example in my U.S. Pat. No. 3,860,300 above referred to. A source of such a signal is here represented as a block 51 from which a signal representative of displacement is supplied to an amplifier 99, the output of which is applied through lead 101 to the output of amplifier 87 for combination with the signal representative of rate of displacement. The combined signals are then supplied through lead 89 to a magnetic force applier comprising a permeable core 91 and a winding 93 positioned in juxtaposition to a permanent magnet disc 95 affixed to rod 1 for applying force to rod 1 in a direction along its vertical axis for tending to restore it to its normal stable position in the vertical direction.

Again in accordance with the invention, in some instances it may be desirable to provide additional circuitry similar to that above described for deriving a signal representative of acceleration of the suspended rod 1 in the direction of its longitudinal axis and for adding it to the displacement and rate-representative signals supplied to force applier 91, 93. Such means also are shown in FIG. 1 comprising capacitor 102, resistor 103 and amplifier 104 for differentiating the output from amplifier 87 and supplying the resulting signal to lead 101.

From the foregoing it will be seen that means have been provided for counteracting any tendency toward displacement of the suspended rod 1 in either direction along its vertical axis, and also for counteracting any tendancy toward displacement of either of its extremities in directions mutually at right angles to each other and transverse to the vertical axis. While this arrangement affords complete control over all possible displacements of the suspended rod 1, it will be understood that under some circumstances such complete control may not be required, and one or more portions of the apparatus described may be omitted. Thus it may be desirable to provide control only in the direction along the vertical axis or only in the directions transverse thereto.

In the construction of apparatus in accordance with the invention above described, it is important that the windings of each pair—i.e., the windings 17 and 19, 21 and 23, and 77 and 79—be positioned as close together as possible to minimize the effects of stray magnetic fields. Also it is important that the response time of the system be kept to a minimum. The latter result is achieved by avoiding the use, in the permanent magnets which cooperate with the windings, of material of high permeability and by using instead material such as samarium cobalt having a permeability of unity. Since this material is particularly effective when used in thin sections, this makes it possible to achieve very close spacing of the windings in each pair, the only limitation being the magnitude of the air gap in the suspension system—i.e., between magnets 3 and 5 and between their counterparts at the lower extremity of the suspended rod 1. In practice the gap in the suspension system may be 0.050" or less, and the spacing of the coils may be 0.150" or less.

Further, in the construction of apparatus according to the invention, it may be found that the windings in each pair are not identical in their characteristics so that complete cancellation of signals induced therein by external fields may not occur. This difficulty may be overcome by providing a simple bridge-type balancing arrangement employing a potentiometer 121 as shown in FIG. 3, for example between the windings 17 and 19 and the input to amplifier 31.

While the invention has been described with reference to a single preferred embodiment, it will be apparent to those skilled in the art that the invention may be embodied in various other physical forms within the scope thereof as defined by the following claims

I claim:

1. In a magnetic suspension system comprising a body to be supported by said system and magnetic force applying means for applying force to said body to maintain it in suspension, means responsive to the rate of displacement of said body along an axis thereof for restoring it to a desired stable position, said means comprising:
 (a) means affixed to said body for producing separate magnetic fields,
 (b) at least one pair of conductive windings, each positioned at least partially within one of said magnetic fields so as to have currents induced therein in response to movement of said body along said axis and proportional to the rate of movement of said body, said windings being interconnected so that said currents reinforce each other and so that currents induced therein by stray magnetic fields oppose each other, and
 (c) means responsive to the combined currents induced in said windings for applying forces to said body in a direction to restore it to its desired stable position.

2. A system according to claim 1 in which said magnetic field producing means comprise three permanent magnets affixed to said body, spaced along the axis thereof and each polarized in the direction of said axis, two of said magnets positioned on opposite sides of a third of said magnets being of like polarization and said third magnet being oppositely polarized, said windings encircling said body and being disposed respectively intermediate different adjacent pairs of said magnets.

3. A system according to claim 1 in which said means for producing magnetic fields comprise four permanent magnets affixed to said body, spaced apart in the direction transverse to said axis and each polarized in said direction, two adjacent ones of said magnets being polarized in the same sense and the remaining adjacent ones being polarized in the opposite sense, said windings comprising four windings, each comprising conductors disposed in planes substantially parallel to said axis, said windings being disposed in pairs on opposite sides of said body, portions of each winding in each pair being interposed between adjacent ones of said magnets of like polarization, the windings in each pair being serially electrically connected so that voltages induced therein in response to movement of said body in a direction transverse to said axis reinforce each other and so that currents induced therein by stray magnetic fields oppose each other.

4. A system according to claim 1 in which said means for producing magnetic fields comprise a plurality of thin, closely-spaced discs of permanent magnet material affixed to said body, and in which at least portions of each of said windings are interposed between adjacent ones of said discs.

5. A system according to claim 4 in which said permanent magnet material has a permeability of substantially unity.

6. A system according to claim 4 in which said permanent magnet material is samarium cobalt.

7. A system according to claim 1 including additional means for developing a signal representative of acceleration of said body along said axis, and means for utilizing said signal to further control the application of force to said body to restore it to its desired stable position.

8. A system according to claim 7 in which said signal developing means comprises a differentiating circuit responsive to said currents induced in said windings.

* * * * *